United States Patent [19]

Massee

[11] Patent Number: 4,565,081
[45] Date of Patent: Jan. 21, 1986

[54] FORMING MACHINE

[76] Inventor: Johan Massee, Mercuriushof 8, 3951 EP Maarn, Netherlands

[21] Appl. No.: 606,159

[22] Filed: May 2, 1984

[30] Foreign Application Priority Data

May 11, 1983 [NL] Netherlands ............ 8301678

[51] Int. Cl.⁴ .............. B21D 22/16; B21D 22/18
[52] U.S. Cl. .............................. 72/19; 72/21; 72/22; 72/83; 72/85; 72/434; 72/465
[58] Field of Search ..................... 72/80–85, 72/19, 21, 22, 7, 11, 432, 433, 434, 102, 8, 246, 465

[56] References Cited

U.S. PATENT DOCUMENTS

| 1,876,747 | 9/1932 | Rainsford | 72/82 |
| 4,118,846 | 10/1978 | Korte | 72/81 |
| 4,132,098 | 1/1979 | Culver | 72/102 |
| 4,509,351 | 4/1985 | Rolin et al. | 72/19 |

FOREIGN PATENT DOCUMENTS

| 358199 | 9/1922 | Fed. Rep. of Germany | 72/81 |
| 2124521 | 12/1972 | Fed. Rep. of Germany | 72/82 |
| 2457504 | 6/1976 | Fed. Rep. of Germany | 72/81 |
| 2802165 | 3/1979 | Fed. Rep. of Germany | 72/83 |
| 1364623 | 5/1964 | France | 72/84 |
| 12279 | 5/1968 | Japan | 72/102 |
| 23020 | 8/1970 | Japan | 72/11 |
| 19931 | 2/1981 | Japan | 72/83 |
| 181728 | 11/1982 | Japan | 72/84 |
| 1237760 | 6/1971 | United Kingdom | 72/82 |
| 1325872 | 8/1973 | United Kingdom | 72/82 |
| 2075389 | 11/1981 | United Kingdom | 72/82 |
| 654318 | 3/1979 | U.S.S.R. | 72/81 |

Primary Examiner—Lowell A. Larson
Attorney, Agent, or Firm—Kane, Dalsimer, Kane, Sullivan and Kurucz

[57] ABSTRACT

A forming machine comprises a rotatingly drivable gripping device (1) for gripping a forming tool (2) and a material plate (3) to be formed, a movable lower slide (6), a first drive (8) for moving the lower slide, a movable upper slide (10, 35) mounted on the lower slide, a second drive (11, 34) for moving the upper slide and a holder (5) for a forming roller (4) supported on the upper slide (10, 35). A control unit (16) is provided for controlling the movement of the forming roller (4) by actuating both drives (8; 11, 34), the control unit being connected to a detector (18, 21) for determining the force exerted on the forming roller (4) and to a detector (17) for determining the position of the lower slide (6). A memory (25) is connected to the control unit for storing corresponding force/position values. The control unit (16) is adapted to control the movement of the forming roller (4) in dependence on the force/position values stored in the memory (25). The forming roller (4) is coupled to the second drive (11, 34) through a spring (13, 38) with a given spring characteristic. The detector (18, 21) for determining the force exerted on the forming roller consists of a position detector (18, 21) for determining the compression of the spring (13, 38).

11 Claims, 5 Drawing Figures

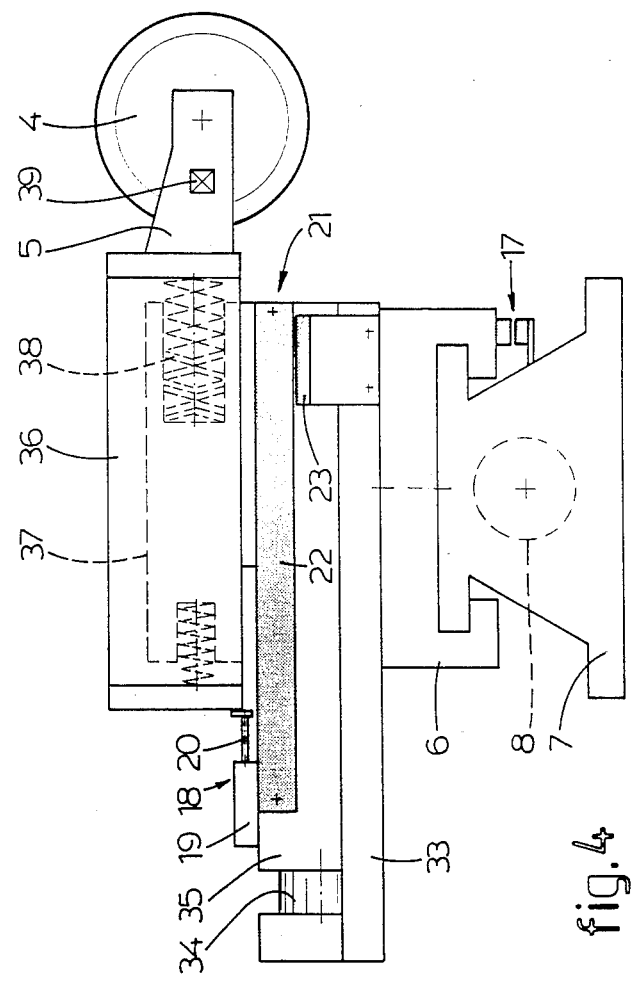

FORMING MACHINE

The invention relates to a forming machine comprising a rotatingly drivable gripping device for gripping a forming tool and a material plate to be formed, a movable lower slide, a first driving means for moving the lower slide, a movable upper slide mounted on the lower slide, a second driving means for moving the upper slide, a holder for a forming roller supported on the upper slide, and a control unit for controlling the movement of the forming roller by actuating both said driving means, said control unit being connected to a detector for determining the force exerted on the forming roller and to a detector for determining the position of the lower slide, wherein a memory is connected to the control unit for storing corresponding force/position values, the control unit being adapted to control the movement of the forming roller in dependence on the force/position values stored in said memory.

Such a forming machine is for example known from European patent application No. 0 057 136. At this known forming machine problems occur in practice with respect to the control of the moving of the forming roller. Due to a possible eccentricity of the forming tool or to variations in the thickness of the material plate to be formed, the occurring forces can quickly vary during the forming work, wherein the control unit tries to correct said variations by moving the forming roller in order to keep the force exerted on the forming roller in conformity with the force values stored in the memory. Thereby however, an instability in the control occurs, whereby a correct operation of the forming machine is not possible anymore.

The invention aims to provide a forming machine of the above-mentioned kind, wherein said disadvantage is obviated in a simple but nevertheless effective manner.

To this end, the forming machine according to the invention is characterized in that the forming roller is coupled to the second driving means through a spring means with a given spring characteristic, wherein said detector for determining the force exerted on the forming roller consists of a position detector for determining the compression of the spring means.

In this manner it is obtained that the quick variations in the occurring forces due to possible eccentricity or varying material thickness and the like are absorbed by the spring means so that an instability of the control can not occur. The control of the moving of the forming roller can nevertheless be carried out in dependence on the force exerted on the forming roller as a certain compression of the spring means corresponds to a certain force exerted on the forming roller.

The control in dependence on the force/position values stored in the memory shows the advantage that the forming machine can be set very quickly by manufacturing a first product be means of manual control, wherein the force exerted on the forming roller can be continuously read and stored in the memory together with the corresponding position of the lower slide. When the control unit of the forming machine has stored a series of position values for the compression of the spring means and the corresponding position of the lower slide in the memory for a given product, next products can be formed because the control unit moves the forming roller in such a manner that the position values provided by both said detectors continuously correspond to the values stored in the memory. As the setting time is only a few minutes, the forming machine according to the invention is also suited for manufacturing products in small series. Moreover, the advantage is obtained that products with a non rotation-symmetrical shape can also be manufactured.

According to a first embodiment of the invention the holder for the forming roller is directly fixed to the upper slide, wherein said second driving means is coupled to the upper slide through the spring means.

As an alternative the holder for the forming roller can be attached to an auxiliary slide slidably mounted on the upper slide, wherein the spring means is disposed between the auxiliary slide and the upper slide.

According to the invention a position detector can be provided for determining the position of the upper slide, said position detector being coupled to the control unit.

The invention will hereinafter be further explained by reference to the drawings in which two embodiments of the forming machine according to the invention are shown.

FIG. 4 is a partially shown schematical section corresponding to FIG. 2 of a second embodiment of the forming machine according to the invention.

Figure 1:
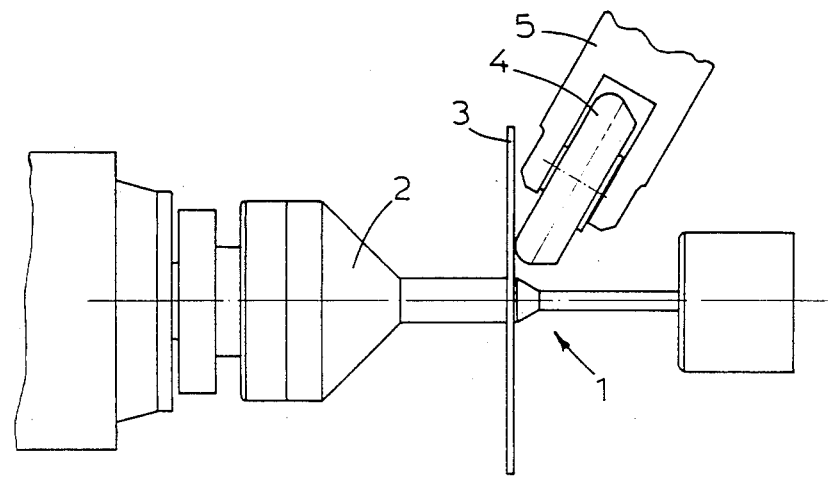
FIG. 1 is a schematical top view of a portion of a forming machine according to the invention.

FIG. 1 schematically shows a top view of a portion of a forming machine comprising a rotatingly drivable gripping device 1 in which a forming tool 2 is provided. A disc-like metal plate 3 is clamped against the forming tool 2 in a conventional manner. The metal plate 3 has to be deformed into a desired product on the forming tool 2 by means of a forming roller 4 which is rotatably borne in a fork-shaped holder 5. To this end the forming roller 4 should follow a predetermined moving path and therefore, the holder is supported by a movable upper slide mounted on a movable lower slide as indicated hereinbelow.

Figure 2:
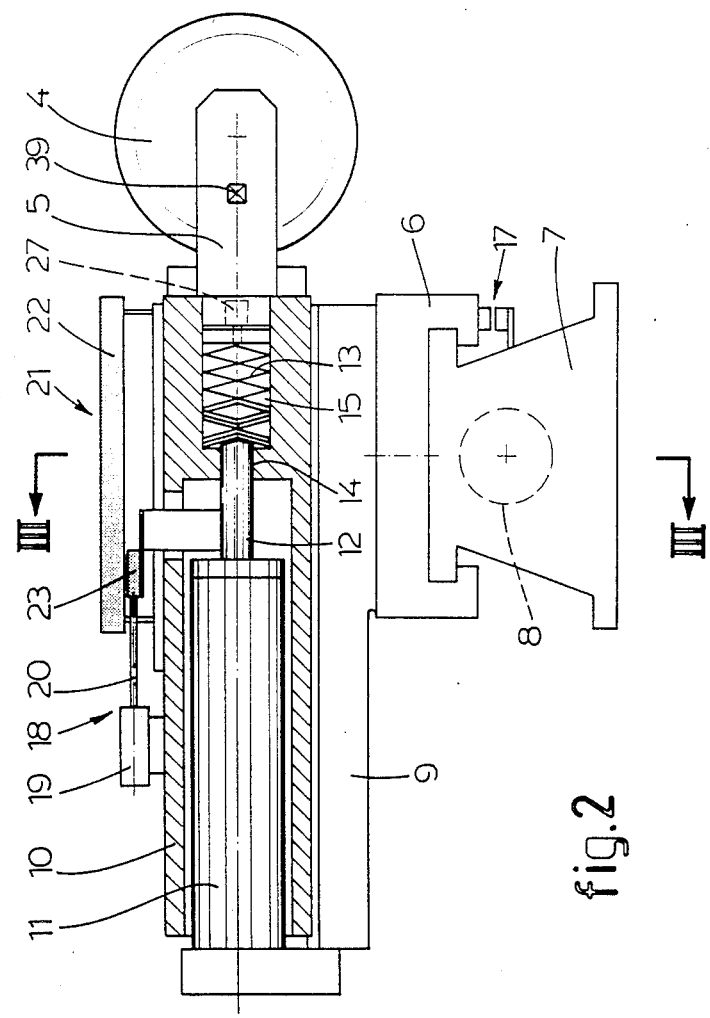
FIG. 2 is a partially shown schematical section of a first embodiment of the forming machine according to the invention.
Figure 3:
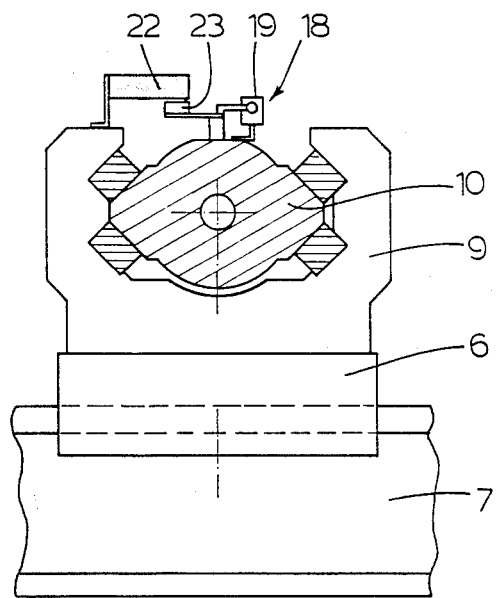
FIG. 3 is a section according to the line III—III of FIG. 2.

Referring to FIGS. 2 and 3 there are schematically shown two sections of such a slide assembly comprising a lower slide 6 slidably mounted on a lower bed 7. A first driving means 8 indicated by a dash line serves for the moving of the lower slide 6. An upper bed 9 is mounted on the lower slide 6, said upper bed 9 having a substantially U-shaped cross-section as shown in FIG. 3. An upper slide 10 is slidably mounted in this U-shaped upper bed 9, said upper slide 10 being movable by means of a second driving means 11. The holder 5 of the forming roller 4 is attached to the upper slide 10.

The driving means 11 consists of a cylinder piston assembly, the piston rod 12 of which is coupled to the upper slide 10 and therefore to the forming roller 4 through a spring means 13 made as a mechanical spring. The piston rod 12 is led with clearance through an opeing 14 to a chamber 15 in which the spring means 13 is mounted.

Figure 5:
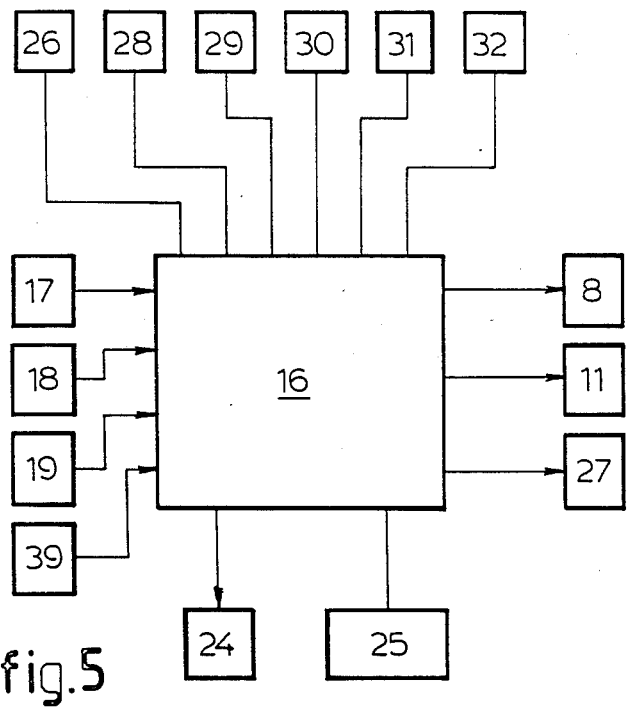
FIG. 5 shows a block diagram of the control unit with associated components of the forming machine according to the invention.

The control of the forming machine according to FIGS. 2 and 3 is attended to by a control unit 16 shown in a block diagram in FIG. 5. The control unit 16 is connected to a detector 17 for determining the position of the lower slide 6. Further, a detector 18 is provided for determining the compression of the spring means 13. Said detector 18 consists of a transducer 19 mounted on the upper slide 10, and a transmitting element 20 movable with respect to the transducer 19 and coupled to the piston rod 12 of the driving means 11. Finally, a position detector 21 is provided, the transducer 22 of which being mounted on the upper bed 9, while a transmitting element 23 is coupled to the piston rod 12 of the driving means 11. The detector 21 is also connected to the control unit 16.

As at the forming machine described the compression of the spring means 13 the spring characteristic of which is known, is determined by means of the detector 18, the force exerted on the forming roller 4 is also known. For, a given compression of the spring means 13 will correspond to a given force exerted on the forming roller 4.

The operation of the forming machine described is as follows:

An operator makes a first product on the forming tool 2 by manual control, during which the operator can continuously read the force exerted on the forming roller 4 or the compression of the spring means 13 from an indicator 24. The force exerted on the forming roller 4 is periodically stored in a memory 25 together with the corresponding position of the lower slide 6 determined by the detector 17.

When the product is produced to the satisfaction of the operator, the operator can switch on the control unit 16 for controlling the moving of the forming roller 4 after which the control unit moves the lower slide 6 and the upper slide 10 by operating the driving means 8 and 11 in dependence on the force/position values stored in the memory 25 in such a manner that the signal values provided by the detectors 17, 18 each time correspond to the values read from the memory 25.

If desired it is possible to switch from a control in dependence on the values provided by the detector 18 to a control in dependence on the position values provided by the detector 21. During manufacturing products it is always possible to manually set different values for the allowable force on the forming roller 4 by means of an adjustment means 26.

Because the forming roller 4 is coupled to the driving means 11 through the spring means 13 with known spring characteristic, no problems will occur during manufacturing products at a possible eccentricity of the forming tool, a varying thickness of the material and the like. If for example the thickness of the material plate 3 varies, a quick variation in the force exerted on the forming roller 4 will occur. If said force would be determined directly by the control unit 16 by means of a suitable detector, the control unit 16 would try to compensate this variation through a corresponding control of the driving means 11. Thereby an instability of the control will be caused, whereby a correct operation of the forming machine is not possible anymore.

At the forming machine described such quick variations in the force exerted on the forming roller will be absorbed by the spring means 13.

If for some products it is necessary to operate continuously in a predetermined portion of the spring characteristic of the spring means 13, the control unit 16 can previously set the spring means 13 in this portion of the spring characteristic. To this end, an adjustment means 27 is provided controlled through the control unit 16 and by means of which a desired biasing of the spring means 13 is possible. The adjusting means 27 can be made as a cylinder piston assembly for example.

As shown in the block diagram of FIG. 5 a plurality of adjusting means 28–32 are provided and connected to the control unit 16. The adjusting means 28 is provided for adjusting the moving speed of the lower slide 6, which information can also be stored in the memory 25 during forming a first product. At subsequent products the control unit can determine the moving speed of the lower slide 6 in dependence on the speed stored in the memory.

The adjustment means 29 is provided for adjusting the speed of revolutions of the gripping device 1. This speed of revolutions will be varied during deforming the material plate 3 in dependence on the diameter of the forming tool 2. The control unit 16 can store the variation of the speed of revolutions of the gripping device 1 periodically in the memory 25 during the forming of the first product, whereafter the control unit 16 can control the speed of revolutions in dependence on this data. It is also possible to set the diameter range of the forming tool 2 by means of an adjustment means 30 so that the control unit 16 can calculate the variation of the speed of revolutions from the starting speed of revolutions and store said variation in the memory.

The adjustment means 31 and 32 are provided for adjusting the type of material and the thickness of the plate to be deformed respectively.

FIG. 4 schematically partially shows a section of a second embodiment of the forming machine of the invention. Just as the forming machine of FIGS. 2 and 3, the forming machine of FIG. 4 is provided with a lower slide 6 slidably mounted on a lower bed 7, wherein the moving of the lower slide 6 is provided by a driving means 8. An upper bed 33 is mounted on the lower slide 6, said upper bed 33 supporting an upper slide 35 movable by a driving means 34. In this case the driving means 34 is directly connected to the upper slide 35. In this embodiment, the forming roller 4 with the holder 5 is attached to an auxiliary slide 36 movably mounted on a bed 37 which is fixed to the upper slide 35. Between the auxiliary slide 36 and the bed 37 a spring means 38 with known spring characteristic is mounted, which spring means 38 is made as a mechanical spring. In this manner, the forming roller 4 is coupled to the driving means 34 through the spring means 38.

The transducer 19 of the detector 18 for determining the compression of the spring means 38 is attached to the upper slide 35, while the transmitting element 20 is connected to the auxiliary slide 36. The position of the upper slide 35 is determined by the detector 21, the transducer 22 of which is mounted on the upper slide 35 while the transmitting element 23 is supported by the upper bed 33.

The operation of the forming machine of FIG. 4 corresponds to the above-described operation of the forming machine of FIGS. 2 and 3.

Though an adjustment means for adjusting the initial spring force of the spring means 38 is not provided at the forming machine of FIG. 4 in order to operate directly in a desired portion of the spring characteristic, it will be clear that an adjusting means 27 may of course also be applied at this forming machine according to FIG. 4.

It is noted that in stead of a mechanical spring means it is also possible to use a hydraulic spring means.

Further, it is noted that at a suitable programming of the control unit 16 it will be possible to have the control unit to take care of the adjusting of the forming machine directly in dependence on the measured force without a previous manufactoring of a first product.

Finally, it is noted that in stead of an upper slide rectilinearly movable transverse to the lower slide 6 the forming machine may be provided with an upper slide making a pivotal movement during deforming the material plate 3.

At the embodiments of the forming machine shown in the drawings the arms of the U-shaped holder 5 are provided with detectors 39 for determining the component of the exerted force extending substantially in an axial direction to the forming roller 4. Said detectors 39 are connected to the control unit 16, wherein the control unit will operate the second driving means 11 and 34, respectively, for withdrawing the upper slide 10 and 35, respectively, when an adjustable threshold value is exceeded by said axial component. Thereby, a protection is obtained for those situations in which the force exerted on the upper slide in the moving direction indeed corresponds to the desired force, however unallowable forces being exerted on the forming roller 4 in axial direction.

The invention is not restricted to the above-described embodiments which can be varied in a number of ways within the scope of the invention.

I claim:

1. Forming machine comprising a rotatingly drivable gripping device for gripping a forming tool and a material plate to be formed, a movable lower slide, a first driving means for moving the lower slide, a first detector for determining the position of said lower slide with respect to a first reference, a movable upper slide mounted on the lower slide, a second driving means for moving the upper slide, a forming roller, a holder mounting said forming roller and supported on the upper slide, a second detector for determining the position of said upper slide, with respect to a second reference, a control unit controlling the movement of the forming roller by actuating both said driving means, said control unit being connected to said detectors, wherein a memory is connected to the control unit for storing position values of said slides, the control unit being provided to control the movement of the forming roller in dependence on the position values stored in said memory, wherein the forming roller is coupled to the second driving means through a spring means with a given spring characteristic; and a third detector for determining the compression of said spring means, said third detector being connected to the control unit, wherein the control unit operates the second driving means to withdraw the upper slide when a preselected spring compression is exceeded as detected by said third detector.

2. Forming machine according to claim 1, wherein the holder for the forming roller is directly fixed to the upper slide, said second driving means being coupled to the upper slide through the spring means.

3. Forming machine according to claim 2, wherein the third detector comprises a transducer and a transmitting element, said transducer being mounted on the upper slide and said transmitting element being coupled to the second driving means.

4. Forming machine according to claim 1, wherein the holder for the forming roller is attached to an auxiliary slide slidably mounted on the upper slide, the spring means being disposed between the auxiliary slide and the upper slide.

5. Forming machine according to claim 4, wherein the second detector comprises a transducer and a transmitting element, said transducer being mounted on the upper slide and said transmitting element being coupled to the auxiliary slide.

6. Forming machine according to claim 1, wherein an adjusting device is provided for adjusting the initial spring force of the spring means, said adjusting device being coupled to the control unit.

7. Forming machine according to claim 6, wherein the adjusting device consists of a cylinder piston assembly by means of which the spring means can be compressed.

8. Forming machine according to claim 1, wherein the holder of the forming roller is provided with a fourth detector for determining the component of the exerted force substantially extending in an axial direction to the forming roller, said fourth detector being connected to the control unit, wherein the control unit operates the second driving means to withdraw the upper slide when a threshold value is exceeded by said axial force component.

9. Forming machine according to claim 1, wherein a first adjusting means for the moving speed of the lower slide is provided, the control unit being coupled to the first adjusting means and is provided to store the moving speed of the lower slide in the memory, said control unit further being adapted to determine the moving speed of the lower slide in dependence on the data stored in the memory.

10. Forming machine according to claim 9, wherein a second adjusting means for the speed of revolutions of the gripping device is provided, the control unit being coupled to the second adjusting means and is provided to determine the variation of the speed of revolutions during forming a material plate and to store said variation in the memory, said control unit further being adapted to control the speed of revolutions of the gripping device in dependence on the data stored in the memory.

11. Forming machine according to claim 1, wherein adjusting means are provided for the type and the thickness of the material plate, and for the diameter range of the forming tool, said adjusting means being connected to the control unit.

* * * * *